(12) United States Patent
Paek (10) Patent No.: US 6,807,871 B1
(45) Date of Patent: Oct. 26, 2004

(54) TORQUE DETECTOR

(75) Inventor: Seung Ho Paek, Uijeongbu (KR)

(73) Assignee: Mando Corporation, Kyungki-Do (KR)

( * ) Notice: Subject to any disclaimer, the term of this patent is extended or adjusted under 35 U.S.C. 154(b) by 0 days.

(21) Appl. No.: 10/666,153

(22) Filed: Sep. 19, 2003

(30) Foreign Application Priority Data

Jul. 16, 2003 (KR) ................................. 10-2003-0048596

(51) Int. Cl.$^7$ ................................................ G01L 3/14
(52) U.S. Cl. ............................ 73/862.339; 73/862.338
(58) Field of Search ............................ 73/862.08, 763, 73/862.325–862.339, 862.044

(56) References Cited

U.S. PATENT DOCUMENTS

| | | | | |
|---|---|---|---|---|
| 3,766,787 A | * | 10/1973 | Irvine ....................... | 73/514.02 |
| 3,877,300 A | * | 4/1975 | Ginns ..................... | 73/862.339 |
| 4,750,371 A | * | 6/1988 | Kobayashi et al. ..... | 73/862.336 |
| 5,307,690 A | * | 5/1994 | Hanazawa ............. | 73/862.333 |
| 5,406,834 A | * | 4/1995 | Taniguchi .................. | 73/118.1 |
| 5,449,049 A | | 9/1995 | Every ......................... | 180/197 |
| 5,497,667 A | * | 3/1996 | Nakaura ................. | 73/862.328 |
| 6,591,699 B2 | * | 7/2003 | Ueno ..................... | 73/862.331 |

FOREIGN PATENT DOCUMENTS

JP          08-168703          3/1996

* cited by examiner

Primary Examiner—Edward Lefkowitz
Assistant Examiner—Alandra Ellington
(74) Attorney, Agent, or Firm—Ladas & Parry LLP (57) ABSTRACT

Disclosed herein is a torque detector. The torque includes a synchronous detector, a bridge circuit and a signal converter. The synchronous detector detects an AC voltage signal having a preset DC voltage level and a certain frequency, and generates a detection output signal. In the bridge circuit, a torque detection coil whose inductance varies with rotation of a steering wheel and a temperature compensation coil whose inductance varies with temperature variation are connected in series to each other. The detection output signal and the DC voltage are applied to both ends of the two connected coils, respectively. The bridge circuit allows a first detection voltage to be induced at a connecting point between the two coils by variation of the inductance of the two coils. The signal converter generates a torque detection signal having an amplitude corresponding to a difference between peak values of a preset reference voltage and the first detection voltage.

5 Claims, 9 Drawing Sheets

TORQUE DETECTOR

CROSS-REFERENCE TO RELATED APPLICATION

This application claims the benefit of Korean Application No. 2003-48596, filed Jul. 16, 2003, in the Korean Intellectual Property Office, the disclosure of which is incorporated herein by reference.

BACKGROUND OF THE INVENTION

1. Field of the Invention

The present invention relates, in general, to a steering system for a vehicle and, more particularly, to a torque detector for a vehicle steering system, which detects torque on a steering wheel.

2. Description of the Related Art

A power steering system provides an auxiliary steering force to wheels using an additional auxiliary driving device, so that a steering force, which should be applied to a steering wheel by a user while a vehicle drives at low speeds and stops, is reduced, thus facilitating a manipulation of the steering wheel. An Electronic Power Steering (EPS) system provides a relatively large auxiliary steering force while a vehicle drives at low speeds and stops, and provides a relatively small auxiliary force while the vehicle drives at high speeds, thus satisfying reduction of the steering force while the vehicle drives at low speeds and stops and driving stability while the vehicle drives at high speeds.

In the EPS system, a direction and magnitude of the auxiliary steering force are determined according to a rotation direction and rotation angle of the steering wheel. For this purpose, a torque sensor is used. A principle of torque detection of the torque sensor is to use variation of magnetic flux around a torque detection coil due to rotation of the steering wheel. A torsion bar is disposed between a wheel driving shaft and a steering wheel driving shaft and the torsion bar is twisted by the rotation of the steering wheel. The twisting of the torsion bar varies the magnetic flux around the torque detection coil, so that a magnitude of an inductance of the torque detection coil varies with the variation of the magnetic flux, thus varying an amplitude of a voltage induced to the torque detection coil. An increase or a decrease in the amplitude of the induced voltage becomes an index that indicates the rotation direction and rotation angle of the steering wheel.

Figure 1:
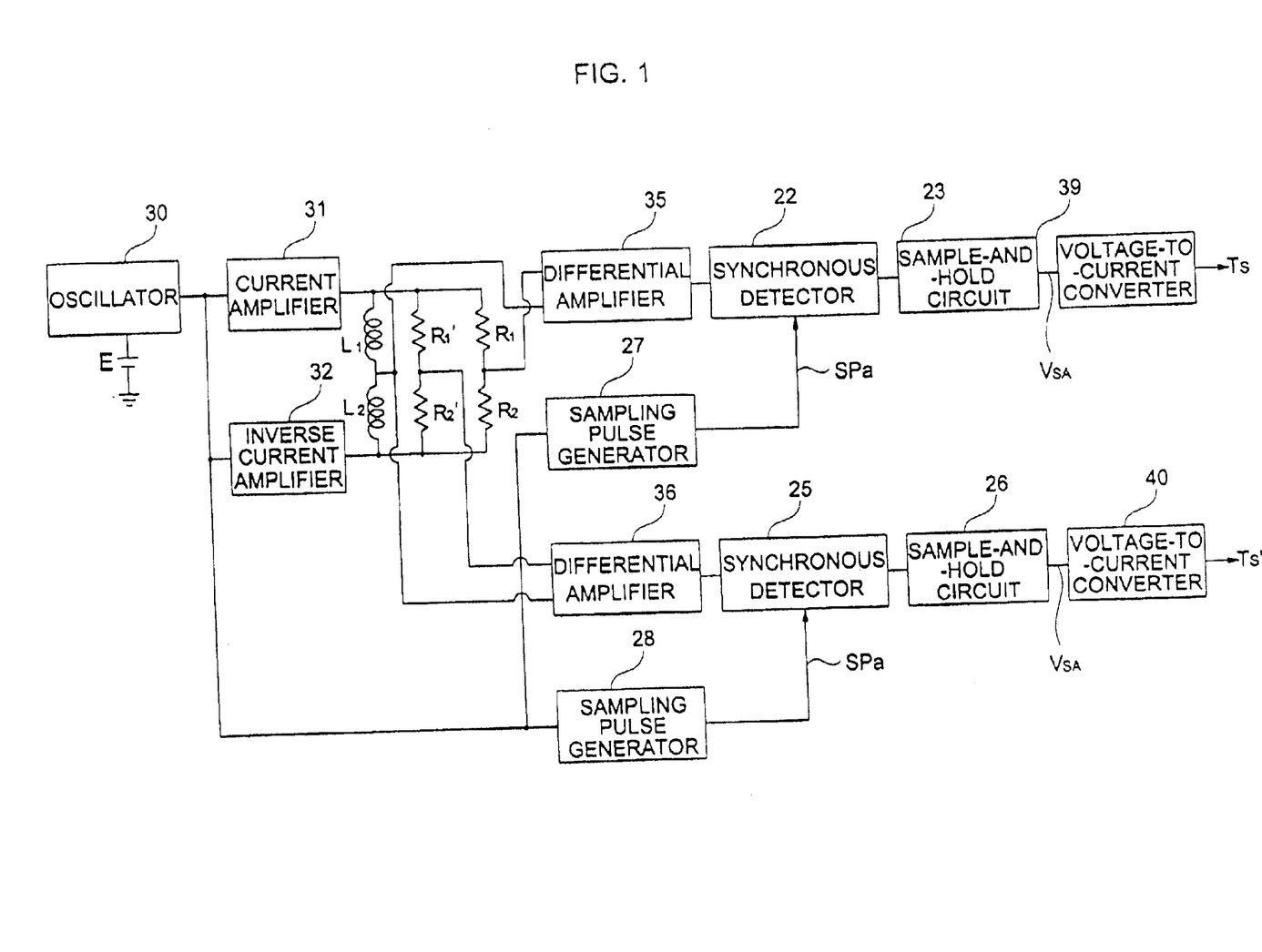
FIG. 1 is a block diagram of a conventional torque detector.

FIG. 1 is a block diagram of a conventional torque detector disclosed in Japanese Patent Publication Hei 8-68703. In the conventional torque detector of FIG. 1, an Alternating Current (AC) voltage output from a current amplifier 31 and an inverse AC voltage output from an inverse current amplifier 32 are applied to both ends of a coil circuit including a coil $L_1$ and a coil $L_2$, respectively. A difference between a torque detection voltage detected in a bridge circuit including the coil $L_1$, the coil $L_2$, a resistor $R_1$ and a resistor $R_2$, and a reference voltage is amplified, and then a torque detection signal $T_S$ is obtained by synchronous detection and sampling.

Figure 2:
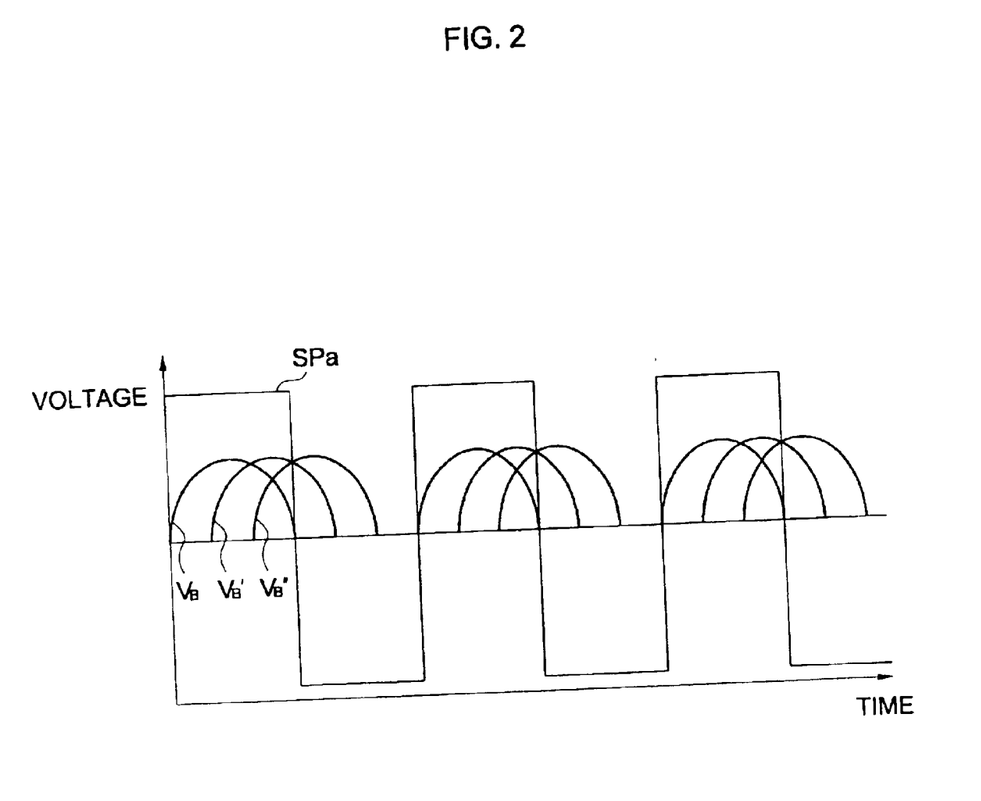
FIG. 2 is a graph showing phase variation of an AC voltage signal and a sampling pulse signal in the conventional torque detector of FIG. 1
Figure 3:
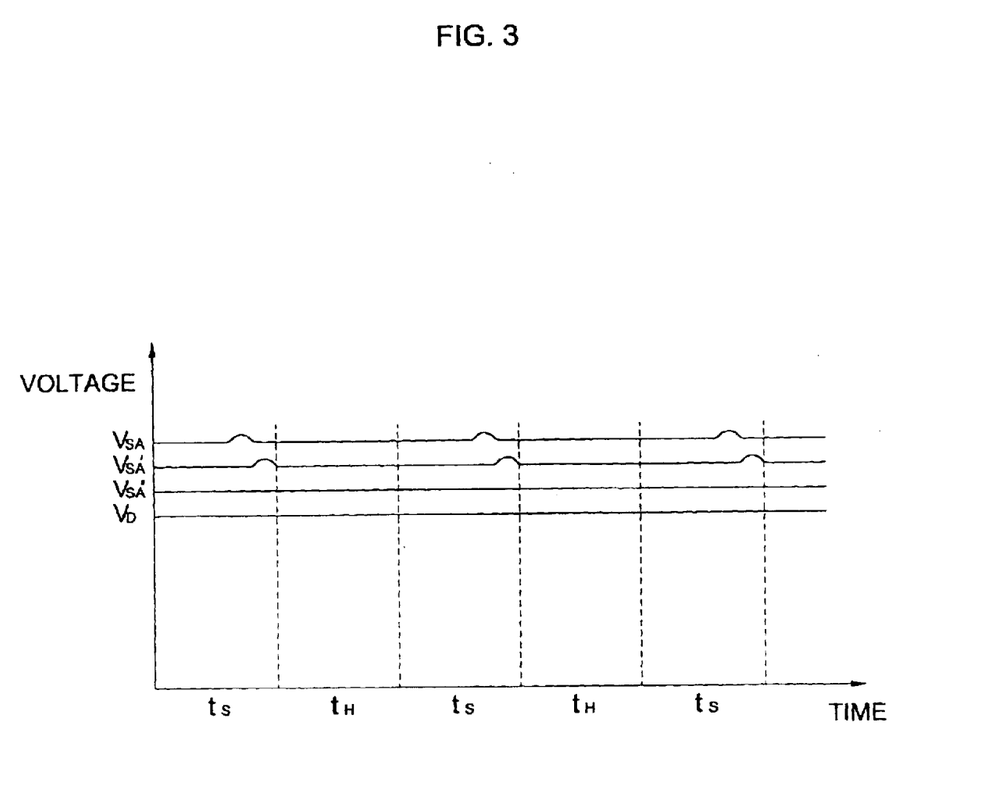
FIG. 3 is a graph showing variation of an output voltage of a sampling hold circuit according to phase variation of the AC voltage signal in the conventional torque detector of FIG. 1.

FIG. 2 is a graph showing phase variation of an AC voltage signal $V_B$ and a sampling pulse signal SPa in the conventional torque detector of FIG. 1. As shown in FIG. 2, only if phases of the AC voltage signal $V_B$ and the sampling pulse signal SPa coincide with each other, accurate synchronous detection and sampling may be achieved. If the phases of the AC voltage signal $V_B$ and the sampling pulse signal SPa do not coincide with each other, sampling errors are generated as shown in FIG. 3. FIG. 3 is a graph showing variation of an output voltage of a sample-and-hold circuit 26 according to phase variation of the AC voltage signal $V_B$ in the conventional torque detector of FIG. 1. As shown in FIG. 3, if the phase of the AC voltage signal $V_B$ does not coincide with the phase of the sampling pulse signal SPa like $V_B$ " shown in FIG. 2, an inaccurate peak value may be sampled like $V_{SA}$" shown in FIG. 3. If an accurate peak value is not sampled in a sampling time $t_s$, a torque detection signal $T_S$ output from a voltage-to-current converter 39 is no longer valid.

SUMMARY OF THE INVENTION

Accordingly, it is an aspect of the present invention to provide a torque detector, which allows accurate torque detection even though a phase of a voltage applied to a coil circuit including a temperature compensation coil and a torque detection coil is destabilized by disturbance, such as temperature variation.

Additional aspects and advantages of the invention will be set forth in part in the description which follows and, in part, will be obvious from the description, or may be learned by practice of the invention.

The foregoing and other aspects of the present invention are achieved by providing a torque detector, including a synchronous detector to detect an AC voltage signal having a preset DC voltage level and a certain frequency, and generate a detection output signal, a bridge circuit in which a torque detection coil whose inductance varies with rotation of a steering wheel and a temperature compensation coil whose inductance varies with temperature variation are connected in series to each other, the detection output signal and the DC voltage being applied to both ends of the two connected coils, respectively, the bridge circuit allowing a first detection voltage to be induced at a connecting point between the two coils by variation of the inductance of the two coils, and a signal converter to generate a torque detection signal having an amplitude corresponding to a difference between peak values of a preset reference voltage and the first detection voltage.

BRIEF DESCRIPTION OF THE DRAWINGS

These and other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

Figure 4:
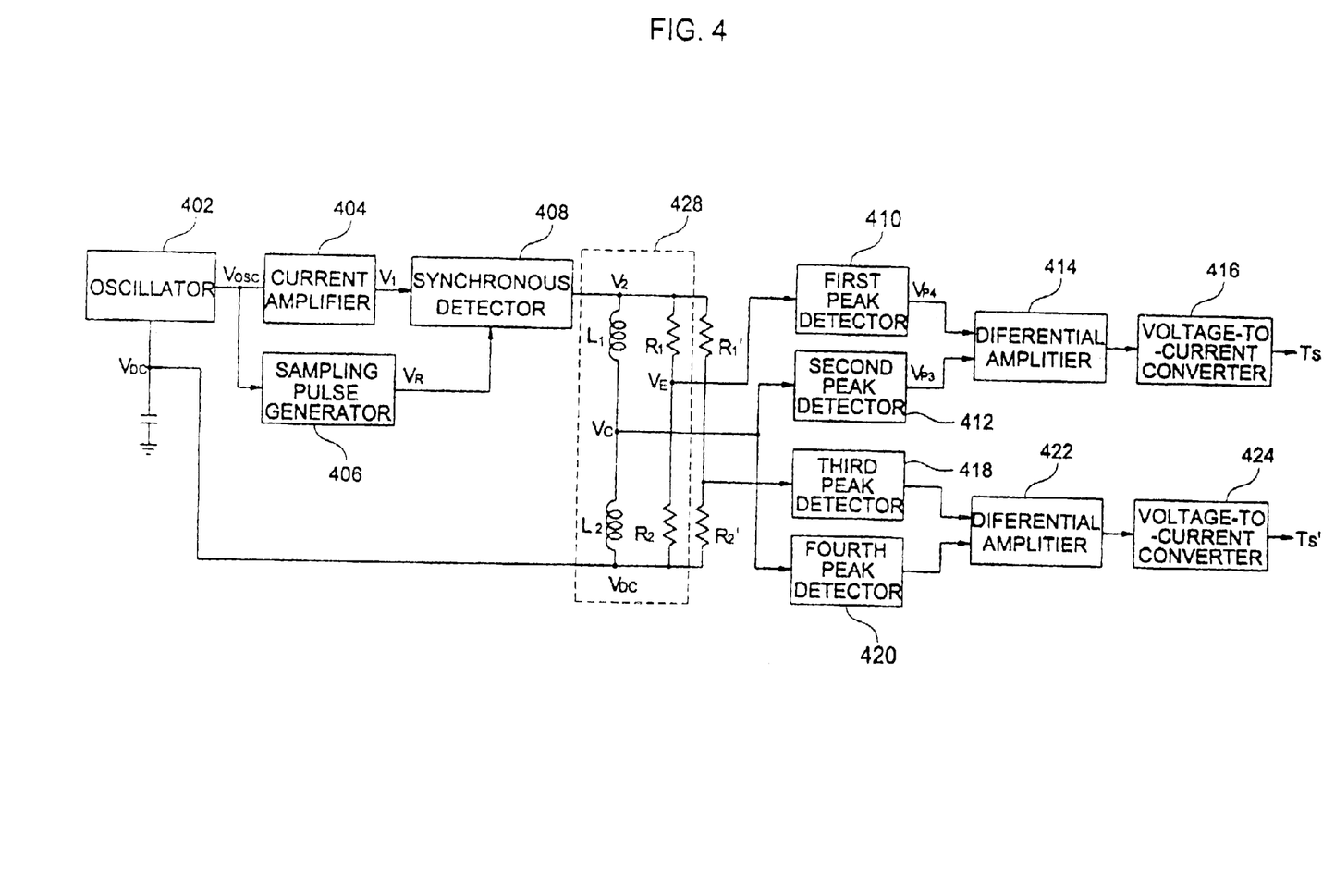
FIG. 4 is a block diagram of a torque detector, according to the present invention.

A torque detector will be described with reference to FIGS. 4 to 9, according to a preferred embodiment of the present invention. FIG. 4 is a block diagram of a torque detector, according to the present invention. As shown in FIG. 4, an oscillator 402 is biased with a DC voltage $V_{DC}$, and generates an oscillation signal $V_{OSC}$ having a certain frequency. A current amplifier 404 generates an AC voltage signal $V_1$ in which a current component of the oscillation signal $V_{OSC}$ output from the oscillator 402 is amplified and a phase and an amplitude of a voltage component of the oscillation signal $V_{OSC}$ are maintained. Accordingly, the AC voltage signal $V_1$ has same phase, amplitude and level of the DC voltage $V_{DC}$ as the oscillation signal $V_{OSC}$ generated from the oscillator 402.

A sampling pulse generator 406 receives the oscillation signal $V_{OSC}$ output from the oscillator 402 and generates a sampling pulse signal $V_R$. The sampling pulse signal $V_R$ has a same phase as the AC voltage signal $V_1$. A synchronous detector 408 receives the AC voltage signal $V_1$ and the sampling pulse signal $V_R$ output from the current amplifier 404 and the sampling pulse generator 406, respectively, and portions of the AC voltage signal $V_1$ having a same phase as the sampling pulse signal $V_R$ are partially detected and output as a detection output signal $V_2$.

A bridge circuit 428 includes a coil circuit that includes a temperature compensation coil $L_1$ and a torque detection coil $L_2$ connected in series to each other, and a resistor circuit that includes a first resistor $R_1$ and a second resistor $R_2$ connected in series to each other. The detection output signal $V_2$ output from the synchronous detector 408 and the DC voltage $V_{DC}$ are applied to both ends of each of the coil circuit and the resistor circuit, respectively. A first detection voltage $V_C$ through which torque on a steering wheel is detected is obtained at a connecting point at which the temperature compensation coil $L_1$ and the torque detection coil $L_2$ are connected to each other.

A principle of torque detection on the steering wheel by use of the bridge circuit 428 is as follows. A torsion bar is disposed between a wheel driving shaft and a steering wheel driving shaft, and the torsion bar is twisted by rotation of the steering wheel. The twisting of the torsion bar varies magnetic flux around the torque detection coil $L_2$, so that a magnitude of an inductance of the torque detection coil $L_2$ varies with the variation of the magnetic flux. Accordingly, torque on the steering wheel is detected by measuring the variation of the inductance of the torque detection coil $L_2$.

The temperature compensation coil $L_1$ is a compensation device that may detect variation of inductance of the torque detection coil $L_2$ due to twisting of the torsion bar. The inductance of the torque detection coil $L_2$ of the coil circuit varies with rotation of the steering wheel and variation of temperature, but the inductance of the temperature compensation coil $L_1$ varies with only the variation of temperature and does not vary with the rotation of the steering wheel. That is, since the variation of the inductance of the temperature compensation coil $L_1$ is caused by disturbance such as variation of temperature of surroundings, the variation of inductances caused by the temperature variation of surroundings is eliminated when the inductance of the temperature compensation coil $L_1$ is cancelled from the inductance of the torque detection coil $L_2$, so that the variation of the inductance of the torque detection coil $L_2$ caused by only rotation of the steering wheel may be detected. A second detection voltage $V_E$ having same phase and amplitude as the first detection voltage $V_C$ is obtained when an inductance of the temperature compensation coil $L_1$ is equal to an inductance of the torque detection coil $L_2$ at a connecting point between the first and second resistors $R_1$ and $R_2$ of the bridge circuit 428. Torque detection of the steering wheel is achieved by comparing the first detection voltage $V_C$ of the coil circuit with the second detection voltage $V_E$ and obtaining a difference therebetween.

The torque detector of the present invention generates a torque detection signal $T_S$ by differentially amplifying peak values of the first detection voltage $V_C$ and the second detection voltage $V_E$ obtained by the bridge circuit 428. In FIG. 4, a first peak detector 410 detects the peak value of the second detection voltage $V_E$ and generates a second peak detection voltage $V_{P4}$, and a second peak detector 412 detects the peak value of the first detection voltage $V_C$ and generates a first peak detection voltage $V_{P3}$. A difference between the second and first peak detection voltages $V_{P4}$ and $V_{P3}$ output from the first and second peak detectors 410 and 412, respectively, is amplified by a differential amplifier 414, and converted into a current form by a voltage-to-current converter 416, thus producing the torque detection signal $T_S$. The torque detection signal $T_S$ may be used to drive a motor that provides an auxiliary driving force to a steering system. In FIG. 4, resistors $R_1'$, and $R_2'$, third and fourth peak detectors 418 and 420, a differential amplifier 422, and a voltage-to-current converter 424 constitutes an auxiliary fail-safe circuit.

Figure 5:
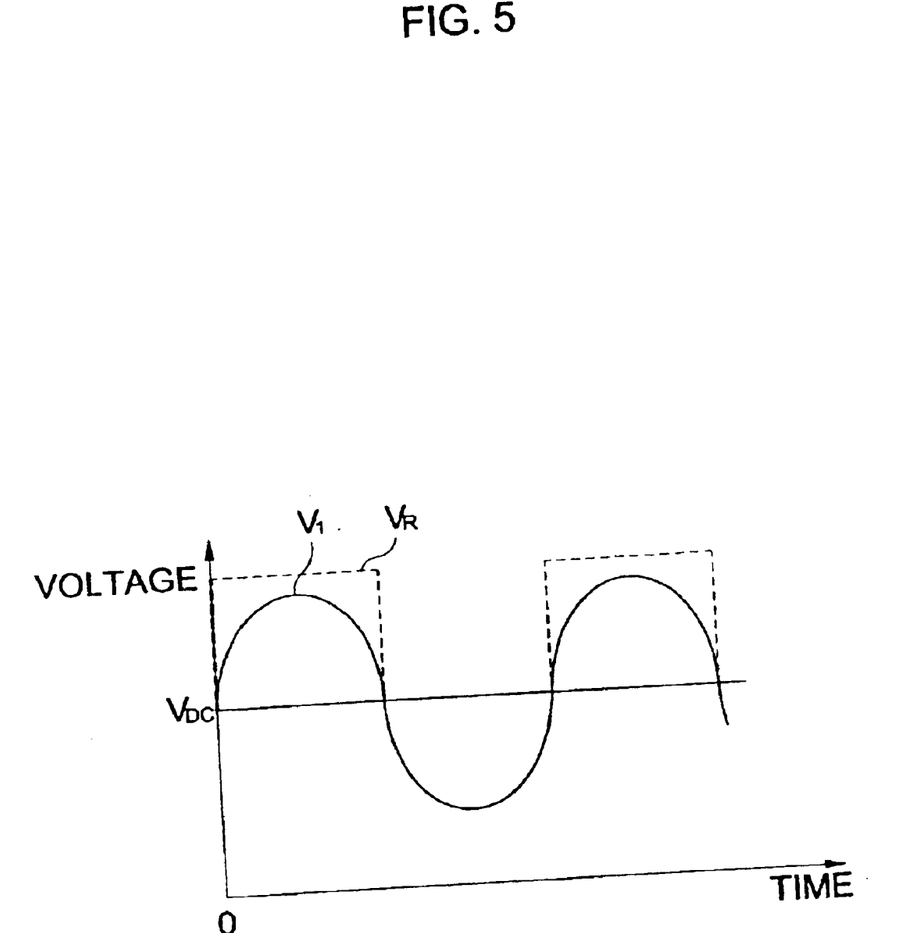
FIG. 5 is a graph showing an AC voltage signal and a sampling pulse signal in the torque detector of FIG. 4, according to the present invention.
Figure 6:
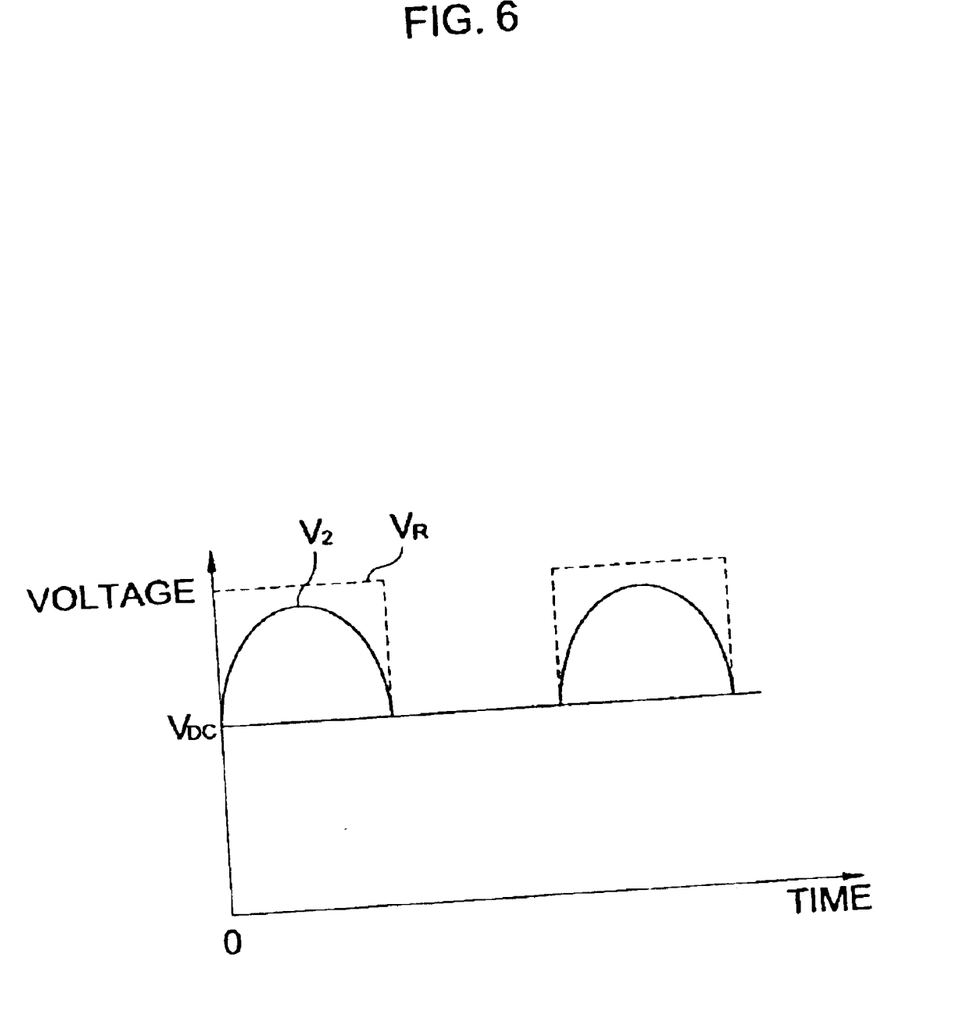
FIG. 6 is a graph showing a detection output signal and the sampling pulse signal in the torque detector of FIG. 4, according to the present invention.

FIG. 5 is a graph showing the AC voltage signal $V_1$ and the sampling pulse signal $V_R$ output from the current amplifier 404 and the sampling pulse generator 406, respectively. It can be appreciated from FIG. 5 that the phases of the AC voltage signal $V_1$ and the sampling pulse signal $V_R$ coincide with each other. FIG. 6 is a diagram showing the detection output signal $V_2$ and the sampling pulse signal $V_R$ output from the synchronous detector 408 and the sampling pulse generator 406, respectively. As shown in FIG. 6, the detection output signal $V_2$, which are formed of only portions of the AC voltage signal $V_1$ corresponding to more than the level of the DC voltage, is produced by partial detection of by the synchronous detector 408.

Figure 7:
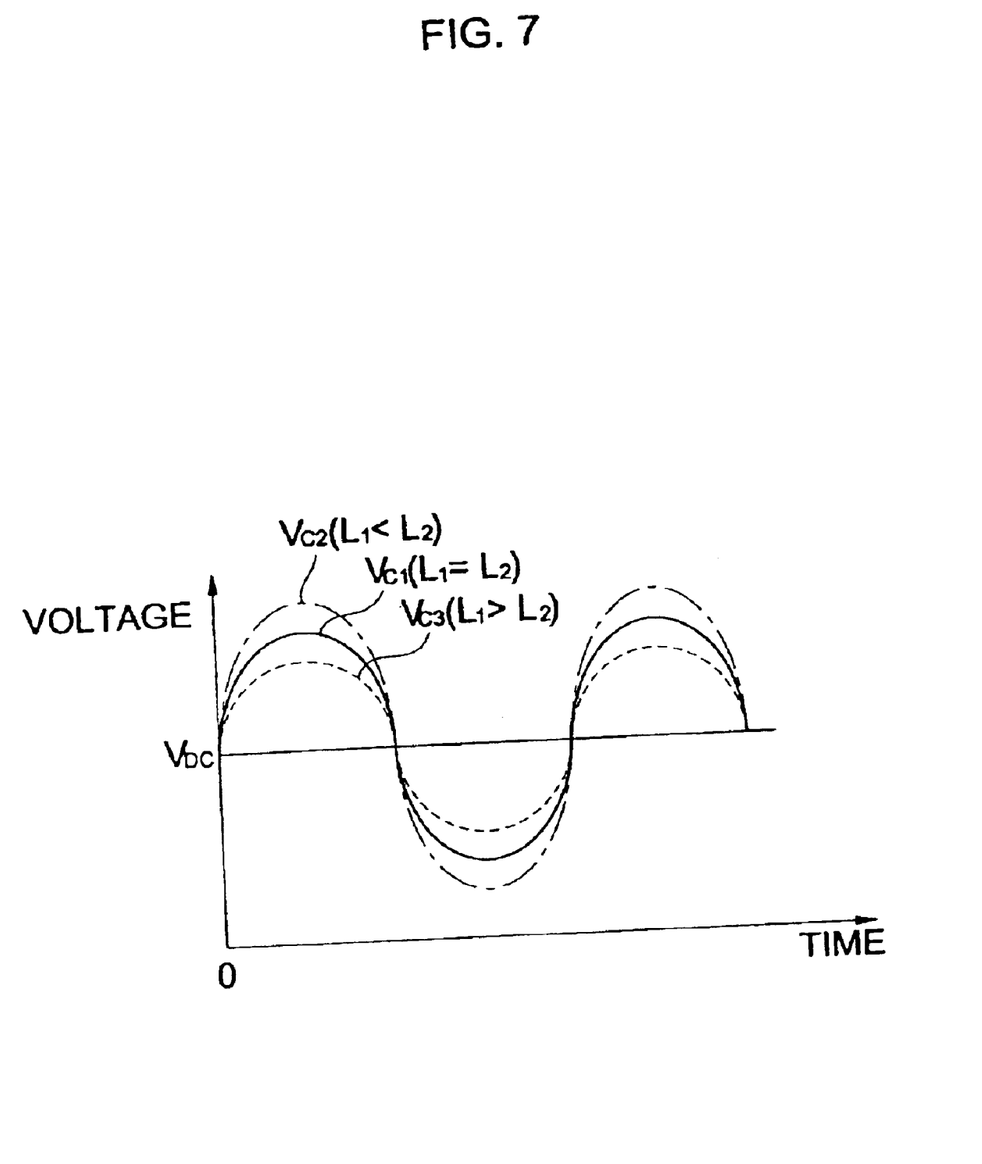
FIG. 7 is a graph showing amplitude variation of a first detection voltage according to inductance variation of a temperature compensation coil and a torque detection coil in the torque detector of FIG. 4, according to the present invention.
Figure 8:
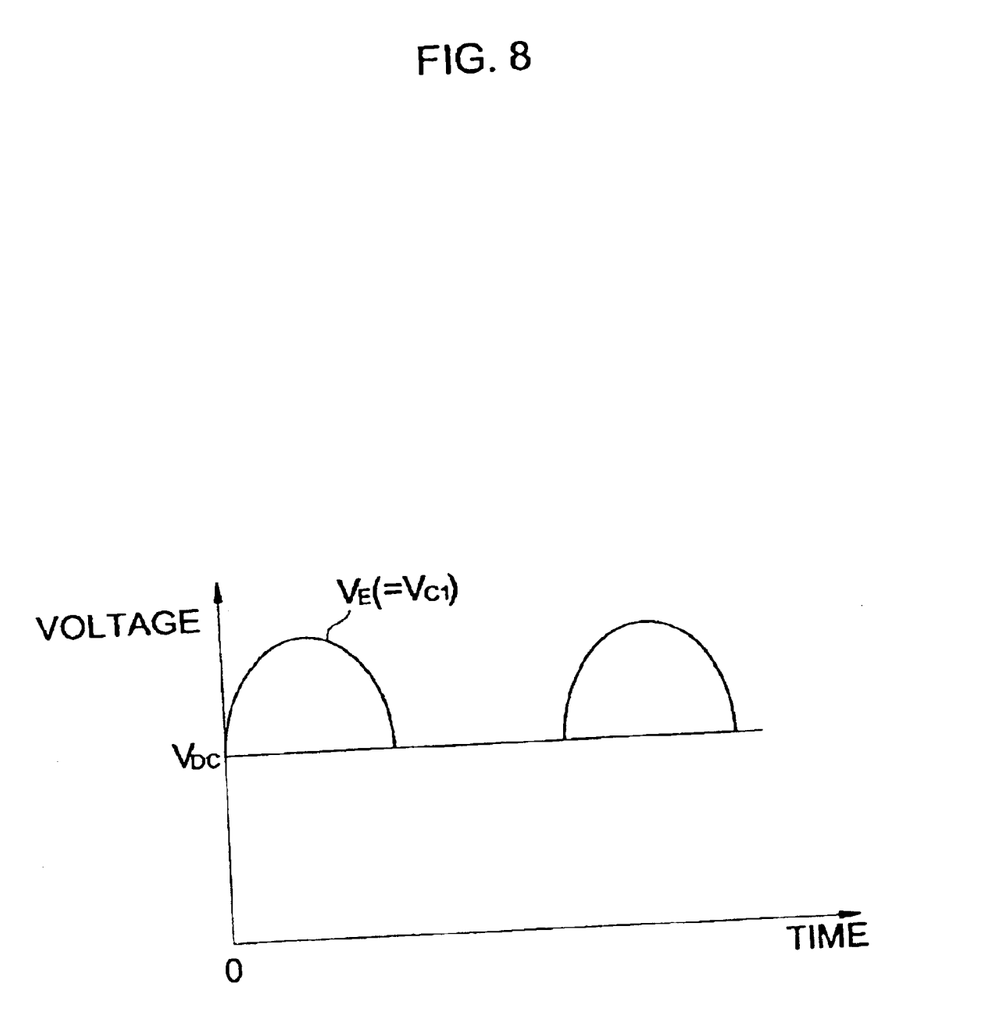
FIG. 8 is a graph showing a second detection voltage obtained in a contact point between first and second resistors in the torque detector of FIG. 4, according to the present invention.

FIG. 7 is a graph showing amplitude variation of the first detection voltage $V_C$ according to inductance variation of the temperature compensation cod $L_1$ and the torque detection coil $L_2$. As shown in FIG. 7, when the steering wheel does not rotate, the inductance of the temperature compensation coil $L_1$ is equal to the inductance of the torque detection coil $L_2$, so that a first detection voltage $V_{C1}$ having a reference amplitude is detected. In contrast, when the steering wheel rotates in a Counter-ClockWise (CCW) direction, the inductance of the temperature compensation coil $L_1$ is larger than the inductance of the torque detection coil $L_2$ by an operation of the torsion bar, so that a first detection voltage $V_{C2}$ having an amplitude greater than the reference amplitude of the first detection voltage $V_{C1}$ is detected. Additionally, when the steering wheel rotates in a ClockWise (CW) direction, the inductance of the temperature compensation coil $L_1$ is smaller than the inductance of the torque detection coil 4 by an operation of the torsion bar, so that a first detection voltage $V_{C3}$ having an amplitude less than the reference amplitude of the first detection voltage $V_{C1}$ is detected. FIG. 8 is a graph showing the second detection voltage $V_E$ obtained in the connecting point between the first and second resistors $R_1$ and $R_2$. The torque on the steering wheel may be detected through a difference between the second and first detection voltages $V_E$ and $V_C$.

Relation between the rotation direction of the steering wheel and the inductance of the coil circuit including the two coils $L_1$ and $L_2$, and the first detection voltage $V_C$ is shown in Table 1.

TABLE 1

| Rotation direction | Inductance | Voltages |
| --- | --- | --- |
| CW | $L_1 < L_2$ | $V_C > V_E$ |
| Stationary | $L_1 = L_2$ | $V_C = V_E$ |
| CCW | $L_1 > L_2$ | $V_C < V_E$ |

Figure 9:
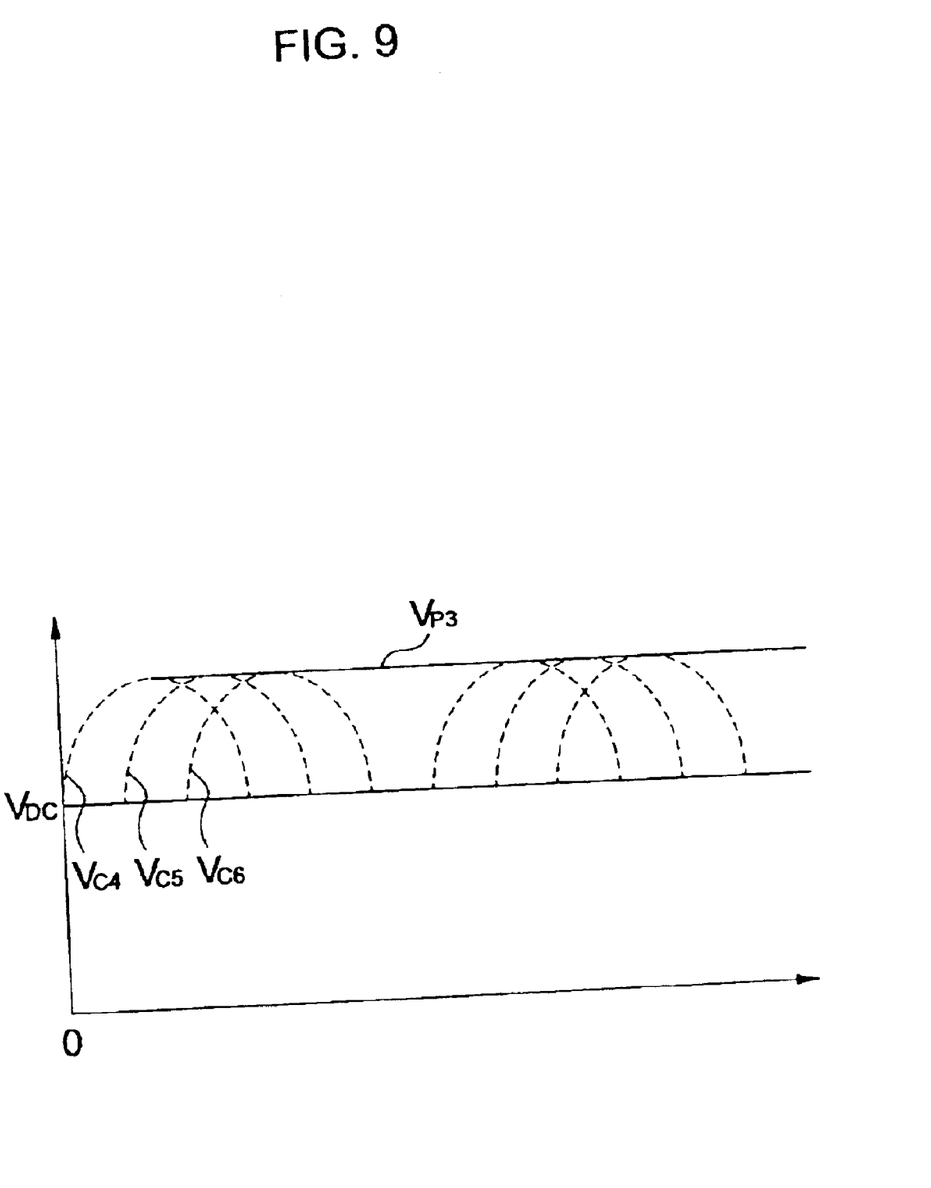
FIG. 9 is a graph showing a first peak detection voltage output from a second detector according to phase variation of the first detection voltage in the torque detector of FIG. 4, according to the present invention.

FIG. 9 is a diagram showing the first peak detection voltage $V_{P3}$ output from the second detector 412 according to phase variation of the first detection voltage $V_C$ in the torque detector, according to the present invention. As shown in FIG. 9, the second peak detector 412 according to the present invention detects peak values of the first detection voltage $V_C$, and outputs the first peak detection voltage $V_{P3}$ of a DC voltage level a corresponding to the detected peak values. Accordingly, the same peak detection voltage $V_{P3}$ is obtained without being influenced by phase variation of the first detection voltage $V_C$ caused by impedance variation of the coil circuit, so that distortion of the torque detection signal $T_S$ may be prevented.

As apparent from the above description, the present invention provides a torque detector, which synchronously detects an oscillation signal, applies the synchronously detected oscillation signal to a coil circuit including a temperature compensation coil and a torque detection coil, and differentially amplifies peak values of a detection voltage obtained in a connecting point between the two coils and a reference voltage, thus preventing distortion of a torque detection signal according to phase variation of the detection voltage.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A torque detector, comprising:

a synchronous detector to detect an Alternating Current (AC) voltage signal having a preset Direct Current (DC) voltage level and a certain frequency, and generate a detection output signal;

a bridge circuit in which a torque detection coil whose inductance varies with rotation of a steering wheel and a temperature compensation coil whose inductance varies with temperature variation are connected in series to each other, the detection output signal and the DC voltage being applied to both ends of the two connected coils, respectively, the bridge circuit allowing a first detection voltage to be induced at a connecting point between the two coils by variation of the inductance of the two coils; and a signal converter to generate a torque detection signal having an amplitude corresponding to a difference between peak values of a preset reference voltage and the first detection voltage.

2. The torque detector according to claim 1, wherein the synchronous detector outputs a half-wave signal of the AC voltage signal corresponding to more than the DC voltage level as the detection output signal.

3. The torque detector according to claim 1, further comprising:

a sampling pulse generator to generate a sampling pulse signal having a same phase as the AC voltage signal;

wherein the synchronous detector is synchronized with the sampling pulse signal to detect the AC voltage signal.

4. The torque detector according to claim 1, wherein the signal converter comprises:

a peak detector to detect peak values of the first detection voltage and the reference voltage;

a differential amplifier to amplify a difference between the peak values detected by the peak detector; and a voltage-current converter to generate the torque detection signal by converting a voltage signal amplified by the differential amplifier into a current signal.

5. A torque detector, comprising:

a sampling pulse generator to generate a sampling pulse signal;

a synchronous detector to receive an AC voltage signal having a same phase as the sampling pulse signal and a preset DC voltage level, detect the AC voltage signal and output a detection output signal formed of a half-wave signal of the AC voltage signal;

a bridge circuit in which a torque detection coil whose inductance varies with rotation of a steering wheel and a temperature compensation coil whose inductance varies with temperature variation are connected in series to each other, the detection output signal and the DC voltage being applied to both ends of the two connected coils, respectively, the bridge circuit allowing a first detection voltage to be induced at a connecting point between the two coils by variation of the inductance of the two coils; and a signal converter to generate a torque detection signal having an amplitude corresponding to a difference between peak values of a preset reference voltage and the first detection voltage.

* * * * *